US006716155B2

(12) United States Patent
Sleeter

(10) Patent No.: US 6,716,155 B2
(45) Date of Patent: Apr. 6, 2004

(54) COPPER-CHROMIUM CATALYZED HYDROGENATION OF POLYUNSATURATED OILS

(75) Inventor: Ronald Sleeter, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 45 days.

(21) Appl. No.: 10/321,728

(22) Filed: Dec. 18, 2002

(65) Prior Publication Data

US 2003/0158433 A1 Aug. 21, 2003

Related U.S. Application Data

(60) Provisional application No. 60/347,000, filed on Jan. 11, 2002.

(51) Int. Cl.$^7$ .............................................. C07C 51/30
(52) U.S. Cl. ...................................... 554/144; 584/141
(58) Field of Search ................................. 554/141, 144

(56) References Cited

U.S. PATENT DOCUMENTS

| | | |
|---|---|---|
| 3,169,981 A | 2/1965 | Kuwata et al. |
| 3,271,410 A | 9/1966 | Cagneron et al. |
| 3,758,532 A | 9/1973 | Gibble |
| 3,780,076 A | 12/1973 | Papahronis et al. |
| 4,133,822 A | 1/1979 | Hasman |
| 4,134,905 A | 1/1979 | Hasman |
| 4,158,665 A | 6/1979 | Hasman |
| 4,169,844 A | 10/1979 | Hasman |
| 4,816,189 A | 3/1989 | Rothbart et al. |
| 4,825,004 A | 4/1989 | Rutzen et al. |
| 4,982,020 A | 1/1991 | Carduck et al. |
| 5,030,609 A | 7/1991 | Turner et al. |
| 5,120,885 A | 6/1992 | Tsukada et al. |
| 5,250,713 A | 10/1993 | Tamura et al. |
| 6,113,971 A | 9/2000 | Elmaleh |

OTHER PUBLICATIONS

Beal, R.E., et al., "Removal of Copper From Hydrogenated Soybean Oil," *J. Am. Oil Chem Soc.* 46:498–500, The American Oil Chemist's Society (1969).

Drozdowski, B., and Nowak–Połomska, "Próby poprawy stabilności oksydacyjnej oleju rzepakowego podwójnie ulepszonego poprzez uwodornienie na katalizatorach miedziowych," Tłuszcze Jadalne 28:17–29, Instytut Przemysłu Tluszczowego (1990).

Drozdowski, B., and Nowak–Połamska, "Improvement of the oxidative stability of rapeseed oil by hydrogenation in the presence of copper catalysts," CAPLUS database: Accession No. 1993:498414, Chemical Abstracts Service (1993).

Frankel, E.N., and Little, F.L., "Homogeneous Catalytic Hydrogenation of Unsaturated Fats: Group VIB Metal Carbonyl Complexes," J. Am. Oil Chem. Soc. 46:256–261, The American Oil Chemists' Society (1969).

Heldal, J.A., and Mørk P.C., "Chlorine–Containing Compounds as Copper Catalyst Poisons," J. Am. Oil Chem. Soc. 59:396–398, The American Oil Chenmists' Society (1982).

Johansson, L.E., and Lundin, S.T., "Copper Catalysts in the Selective Hydrogenation of Soybean and Rapeseed Oils: I. The Activity of the Copper Chromite Catalyst," J. Am. Oil Chem. Soc. 56:974–980, The American Oil Chemists' Society (1979).

Johansson, L.E., and Lundin, S.T., "Copper Catalysts in the Selective Hydrogenation of Soybean and Rapeseed Oils: II. The Effect of a Hydrogen Flow Over Copper Chromite Catalyst," J. Am. Oil Chem. Soc. 56:981–986, The American Oil Chemists' Society (1979).

Johansson, L.E., "Copper Catalysts in the Selective Hydrogenation of Soybean and Rapeseed Oils: III. The Effect of Pressure when using Copper Chromite Catalyst," J. Am. Oil Chem. Soc. 56:987–991, The American Oil Chemists' Society (1979).

Koritala, S., and Dutton, H.J., "Selective Hydrogenation of Soybean Oil with Sodium Borohydride–Reduced Catalysts," J. Am. Oil Chem. Soc. 43:86–89, The American Oil Chemists' Society (1966).

Koritala, S., and Dutton, H.J., "Selective Hydrogenation of Soybean Oil. II. Copper–Chromium Catalysts," *J. Am. Oil Chem. Soc.* 43:556–558, The American Oil Chemists' Society (1996).

Koritala, S., "Selective Hydrogenation of Soybean Oil. III. Copper–Exchanged Molecular Sieves and Other Supported Catalysts," *J. Am. Oil Chem. Soc.* 45:197–200, The American Oil Chemists' Society (1968).

Koritala, S., and Dutton, H.J., "Selective Hydrogenation of Soybean Oil. IV. Fatty Acids Isomers Formed With Copper Catalysts," *J. Am. Oil Chem. Soc.* 46:245–248, The American Oil Chemists' Society (1969).

Moulton, K.J., et al., "Hydrogenation of Soybean Oil With Commercial Copper–Chromite and Nickel Catalysts: Winterization of Low–Linolenate Oils," *J. Am. Oil Chem. Soc.* 48:499–502, The American Oil Chemists' Society (1971).

Moulton, K.J., et al., "Pilot–Plant Selective Hydrogenation of Soybean Oil: Activation and Evaluation of Copper–Containing Catalysts," *J. Am. Oil Chem. Soc.* 46:662–666, The American Oil Chemists' Society (1969).

Popescu, O., et al., "High Oleic Oils by Selective Hydrogenation of Soybean Oil," *J. Am. Oil Chem. Soc.* 46:97–99, The American Oil Chemists' Society (1969).

International Search Report for International Application No. PCT/US02/40469, mailed Apr. 25, 2003.

*Primary Examiner*—Deborah D. Carr
(74) *Attorney, Agent, or Firm*—Sterne, Kessler, Goldstein & Fox P.L.L.C.

(57) ABSTRACT

A process for the hydrogenation of a polyunsaturated oil, wherein said oil is reacted with hydrogen in the presence of a copper-chromium containing catalyst at a temperature of from about 200 to 300° C. and a pressure of from about 300 to 500 psig, for 3–8 hours. The reaction results in a product having a monounsaturated fatty acid percent conversion (i.e., monounsaturated fatty acid content) of from about 60–90%, preferably from about 70–90% and most preferably, from about 80–90%. The copper-chromium catalyst may also be recovered and reused without regeneration or further treatment prior to reuse.

30 Claims, No Drawings

COPPER-CHROMIUM CATALYZED HYDROGENATION OF POLYUNSATURATED OILS

CROSS-REFERENCE TO RELATED APPLICATIONS

This application claims priority to U.S. Provisional Application No. 60/347,000, filed on Jan. 11, 2002.

BACKGROUND OF THE INVENTION

1. Field of the Invention

The present invention is directed to a process for the hydrogenation of polyunsaturated oils to produce products having a high monounsaturated fatty acid (monoene) content, wherein the process utilizes a reusable copper-chromium containing catalyst to reduce the degree of unsaturation in the oil. The resulting product has improved stability and a longer shelf life.

2. Related Art

Polyunsaturated oils are hydrogenated to reduce the degree of unsaturation in the oil, prior to subsequent processing to obtain secondary products, such as food grade oils, additives, lubricants and the like.

Plant oils are useful as components for many nutritional products such as nutraceuticals, and vegetable oils. However, before the oils can be used commercially, particularly for nutritional use, the components responsible for offensive odors, poor taste and poor stability must be removed. The major component contributing to these unfavorable characteristics is the content of polyunsaturated oils, particularly linolenate, present in the oil. The content of linolenate ($C_{18:3}$) in the oil, therefore, is reduced to the more desirable component, monounsaturated fatty acid ($C_{18:1}$).

Reduction of the double bond content in polyunsaturated oils is traditionally carried out by partial hydrogenation, catalyzed by a transition metal catalyst. Various transition metal catalyst, such as nickel, copper, cobalt, palladium and platinum have been used as hydrogenation catalyst. However, copper-chromium combination catalysts (i.e., copper chromite catalyst) have been found to be more selective for production of the monoene. The hydrogenation of the polyunsaturated oils with copper chromite stops with the monoene, with little to no production of the saturated fatty acid in the oil. Popescu et al., *JAOCS* 46(2):97–99 (1969); Koritala et al., *JAOCS* 43(2):86–89 (1966).

In a later study, Koritala hydrogenated 300 mL samples of soybean oil at moderate pressures (i.e., 30 psig), in the presence of 0.1 and 0.5% copper-chromium catalyst, at temperatures of 170 and 200° C. Koritala, et al., *JAOCS* 43(9):556–558 (1966). For those catalysts tested, the average monoene conversion at 170° C. was 37%, and that for 200° C. was 34%. Id. The results, therefore, show that the conversion and selectivity are better at lower temperatures. Id. at 557.

The above studies show that copper-chromium containing catalysts are suitable for hydrogenation of polyunsaturated oils. However, the percent conversion to monoene under the above-described reaction conditions is low (i.e., 34–37%). Another drawback to the above-described processes is that transition metal hydrogenation catalyst are susceptible to poisoning during the reaction process, which decreases the selectivity, yield and stability of the hydrogenated product. For example, Moulton et al. used a heat activated copper-chromium-barium catalyst to hydrogenate soybean oil for five consecutive hydrogenations, without the addition of additional catalyst to the process. Moulton et al. *JAOCS* 43(12):662–666 (1969). A progressive drop in the selectivity for the conversion for each hydrogenation was observed. Id. at 664. Additionally, for the second hydrogenation, the reaction time to obtain a product having an Iodine Value (IV) of 120 was about twice that of the first hydrogenation. Id.

Generally, once poisoned, the catalyst cannot be reused, or it must be reactivated, which is time consuming and costly. Typical catalyst poisons are chlorine (see Heldal et al *JAOCS* 59(9):396–398 (1982)), sulfur and free fatty acids (see U.S. Pat. No. 5,250,713) and water vapor resulting from the reduction of the catalyst, and oxidation products formed during hydrogenation (see Johansson et al. *JAOCS* 56(12):981–986 (1979)). The oxidation products from fatty acids also contribute to the unfavorable taste and odor of the soybean oil, and must be removed prior to processing into food grade oils. Additionally, trace amounts of copper, in the hydrogenated oil, further contribute to the unfavorable taste, odor and stability of soybean oil, and must be removed.

In view of the above, it would be desirable to utilize a catalyst that is resistant to poisoning and can be reused after an initial hydrogenation, without a need for regeneration or replacement with fresh catalyst. It would further be desirable to obtain from a polyunsaturated oil hydrogenation process, a monounsaturated fatty acid percent conversion of greater than about 60%, and preferably greater than about 70%, and more preferably greater than about 80%.

SUMMARY OF THE INVENTION

A method for improving the resistance of copper-chromium catalysts to poisoning during hydrogenation, and additionally improving the percent conversion of the hydrogenated polyunsaturated oil to the monounsaturated form has been discovered by applicants, and is the focus of the invention described below.

The invention is directed to a process for hydrogenating a polyunsaturated oil, comprising:

(a) reacting said polyunsaturated oil with hydrogen in the presence of a copper-chromium containing catalyst, at a temperature of from about 200–300° C. and a pressure of from about 300–500 psig, for about 3–8 hours;

(b) removing said catalyst from a product obtained in (a); and (c) recycling said removed catalyst obtained from (b) to a subsequent hydrogenation reaction, wherein said hydrogenation reaction is carried out as described in (a).

DETAILED DESCRIPTION OF THE INVENTION

In a first embodiment of the invention, applicants have discovered a process for hydrogenating a polyunsaturated oil, wherein the catalyst is reusable. The process of this embodiment comprises:

(a) reacting said polyunsaturated oil with hydrogen in the presence of a copper-chromium containing catalyst, at a temperature of from about 200–300° C. and a pressure of from about 300–500 psig, for about 3–8 hours;

(b) removing said catalyst from a product obtained in (a); and (c) recycling said removed catalyst obtained from (b) to a subsequent hydrogenation reaction, wherein said hydrogenation reaction is carried out as described in (a).

Various polyunsaturated oils from animal and plant sources may be used in the hydrogenation process. Polyunsaturated oils derived from plant sources are preferred. Preferred polyunsaturated oils, obtained from plant sources, may be selected from babassu, coconut, canola, corn, cotton seed, linseed, oiticica, olive, peanut, perilla, rapeseed, safflower, sesame, soybean, sunflower seed, tung and wheatgerm. Of these polyunsaturated oils, canola, corn and soybean are particularly preferred. Soybean oil is most particularly preferred. The plant source from which these oils are obtained, may also be a genetically engineered or modified plant, which may have a fatty acid compositional content that is different than that of a non-genetically engineered or non-modified plant of the same species.

In a second embodiment of the invention, the once recycled catalyst may be reused in subsequent hydrogenation reactions as described in (a) above, without further treatment. Under the conditions of the present invention, the number of times the catalyst may be reused will depend on how long it takes the catalyst to lose a significant amount of its activity and selectivity for conversion to the monoenes. In this instance, the term "significant amount" is defined as a point during the re-use of the catalyst, where a loss of catalytic activity and/or selectivity begins to produce a less than desirable hydrogenated product.

Typically, for conversion to the monoenes, the catalyst may be reused until a loss of at least about 50% of catalytic activity, catalytic selectivity or both, is obtained. The number of times the catalyst may be reused is from about 1–100 times and preferably 4–20 times. Factors that may affect the activity and/or selectivity of the catalyst include, but are not limited to, impurities present in the feedstock oil or incomplete removal of the catalyst from a previous re-use cycle. Generally, the number of times the catalyst may be reused is a function of the ability of the catalyst to continually produce a hydrogenated product, having desired characteristics.

In a third embodiment of the invention, applicants have discovered that the above-described reaction produces a hydrogenated oil in which percent conversion of polyunsaturated fatty acids to the monounsaturated fatty acids is from about 60% to about 90%. A more preferred percent conversion is from about 70% to about 90%, and most preferably a conversion of from about 80% to about 90% may be obtained.

The hydrogenated oil product may further be separated into liquid and solid fractions using fractionation processes known to those of skill in the art. Uses for the liquid fraction include, but are not limited to, vegetable oils, pharmaceuticals and lubricants. Uses for the solid fraction include, but are not limited to, food grade greases, lubricants and components for candles.

The hydrogenated oil product may also be converted to, among other things, diesters of diols, which are useful as lubricants. Additionally, they may be subjected to hydroformylation, to form fatty acid alcohols, aldehydes, imines, amines and the like. Thus, a fourth embodiment of the invention is directed to using the monoenes obtained from the above-described process, as reactants to form other useful products.

The monoene product is generally a triglyceride containing monounsaturated fatty acids. Where the monoene product is used to produce vegetable oils, ultimately the cis form of the monounsaturated fatty acid is the desired reaction product, due to its lower melting point and generally liquid state. However, isomerization to the trans form of the monounsaturated fatty acids occurs during the hydrogenation. The trans form of the monounsaturated fatty acids has a higher melting point, is generally a solid at room temperature, and is less desirable for vegetable oils. Some of the trans form of the monounsaturated fatty acid may be separated from the cis isomer by fractionation of the hydrogenated product. Thus, a fifth embodiment of the invention comprises enrichment of the cis form of the obtained monoene.

The copper-chromium catalysts used to catalyze the hydrogenation of the oil, in accord with the aspects of the invention, are generally compositions having mixtures of CuO and $Cr_2O_3$ or CuO and $CuCr_2O_4$, in various empirical ratios, and also may optionally include other metal oxides which act as promoters, such as BaO. Copper-chromium catalysts are commercially available in a wide range of empirical ratios of $CuO:Cr_2O_3$, such as, for example, 51% CuO and 47% $Cr_2O_3$; or $CuO:Cr_2O_3:BaO$, such as, for example, 40% CuO, 47% $Cr_2O_3$ and 10% BaO. Generally, any of the commercially available copper-chromium catalysts (with or without a promoter metal oxide) have suitable composition ratios and are effective for hydrogenation of the oils, in accord with the invention.

The catalyst may be prepared from the decomposition $Cu(OH)NH_4CrO_4$ in air, at 350–500° C., for about 2 hours. X-ray diffraction analysis shows that during the air heating, the product catalyst has two separate crystalline phases (i.e., CuO and $CuCr_2O_4$). In some of the commercial copper-chromium catalysts, approximately 63 wt. % of the material constitutes the $CuCr_2O_4$ crystalline phase. Other known methods of preparing copper-chromium hydrogenation catalysts may be employed to make suitable catalysts for use in the aspects of the invention.

The resulting catalysts may optionally be used in a powder or granule form, or may be coated on inert support materials and supported for use in accord with the invention. For example, the catalyst may be incorporated within a fixed bed catalyst system.

The following examples are presented to further describe the invention and are not intended to be limiting in any way.

EXAMPLE I 1275 grams of refined, bleached and deodorized soybean oil was combined with 14 grams of G-13 copper chromite catalyst powder (obtained from Süd Chemie, Inc.), in a 2 liter pressure vessel reactor. The reactor headspace was purged and flushed with hydrogen. Hydrogen was then introduced into the reactor to a pressure of 300 psig. The vessel was heated to a temperature of 225–230° C. and the reaction was run for 6 hours at 220–240° C. and 305–330 psig $H_2$, and the product was recovered.

EXAMPLE II

The catalyst from Example I was recovered by filtration, dispersed in 30 mL of refined, bleached and deodorized soybean oil, and added to a reaction vessel. Additional refined, bleached and deodorized soybean oil was added to the reaction vessel such that the total amount of soybean oil in the reaction vessel was 1278 g. The reactor headspace was flushed with hydrogen to a pressure of 300 psig. Hydrogen was then introduced to the reaction vessel to a pressure of 300 psig. The reaction was carried out at a temperature of 220–235° C. and a pressure of 310–330 psig hydrogen for 7 hours, and the product was recovered.

EXAMPLE III

The catalyst from Example II was recovered by filtration, dispersed in 30 mL of refined, bleached and deodorized soybean oil, and added to a reaction vessel. Additional refined, bleached and deodorized soybean oil was added to the reaction vessel such that the total amount of soybean oil in the reaction vessel was 1278 g. The reactor was sealed and purged with hydrogen four times. Hydrogen was then introduced into the reaction vessel to a pressure of 320 psig. The reaction was carried out at a temperature of 215–240° C. and 315–335 psig hydrogen for 5 hours, and the product was recovered.

An analysis of the composition of the product obtained from Examples I–III appears in Table I below. Any difference between the wt. % sum of the components and 100 wt. % of the total hydrogenated oil in each of Examples I–III in Table I, is attributable to the presence of a saturated $C_{16:0}$ component present in the original soy bean oil, prior to hydrogenation. The amount of the saturated $C_{16:0}$ component in the original oil is generally from about 10–11 wt. % in soybean oil.

TABLE I

Soybean Oil Hydrogenation Percent Conversion Values for Reused Copper-Chromium Catalyst

| EXAMPLE | wt. % SATURATED (C18:0) | wt. % MONOENE (C18:1) | wt. % DIENE (C18:2) |
| --- | --- | --- | --- |
| I | 5.2 | 68.8 | 14.0 |
| II | 3.8 | 82.8 | 2.0 |
| III | 3.6 | 79.1 | 3.0 |

When all of the catalyst is separated and recovered from the reaction vessel, no loss of catalyst activity is observed when Examples I–III are run consecutively using recycled catalyst. Therefore, it is possible to obtain a reaction product that is free of any residual or trace amounts of copper or chromium.

EXAMPLE IV

The product of Example I was subject to fractionation to separate the liquid and solid fractions. Fractionation was achieved by crystallization at ambient room temperature followed by suction filtration. The solid fraction was collected as a solid cake. The separation resulted in a liquid fraction of 71.8 wt. % and a solid fraction of 28.2 wt. %.

Further analysis of the liquid and solid fractions resulted in the compositional make-up listed in Table II below.

TABLE II

Compositional Make-Up of Liquid and Solid Fractions from Example IV

| Fatty Acid (FA) Composition | Wt. % Liquid Fraction | Wt. % Solid Fraction |
| --- | --- | --- |
| Total Trans (FAs) | 37.22 | 41.98 |
| $C_{18:1}$ | 69.60 | 66.46 |
| $C_{16:1}$, $C_{20:1}$, $C_{22:1}$ | 0.23 | 0.13 |
| $C_{18:2}$ | 15.77 | 10.68 |
| $C_{20:2}$, $C_{22:2}$ | 0.00 | 0.00 |
| $C_{18:3}$ | 0.02 | 0.00 |
| Saturated | 13.86 | 22.04 |
| Composition TOTAL | 99.48 | 99.31 |

Analysis of the fractionated parts shows the liquid fraction to be higher in the monoene ($C_{18:1}$) and diene ($C_{18:2}$) content and lower in saturated ($C_{18:0}$) and trans fatty acids content than the solid fraction.

Those of ordinary skill in the art will appreciate that variations to the above-described invention are possible within the scope of the disclosure, and the description of the invention is in no way meant to be limiting. All references cited within this disclosure are incorporated herein by reference.

What is claimed is:

1. A process for hydrogenating a polyunsaturated oil, comprising:
    (a) reacting said polyunsaturated oil with hydrogen in the presence of a copper-chromium containing catalyst, at a temperature of from about 200–300° C. and a pressure of from about 300–500 psig, for about 3–8 hours;
    (b) removing said catalyst from a product obtained in (a); and
    (c) recycling said removed catalyst obtained from (b) to a subsequent hydrogenation reaction, wherein said hydrogenation reaction is carried out as described in (a).

2. The process according to claim 1, wherein the reaction is carried out at a temperature from about 225° C.

3. The process according to claim 1, wherein the reaction is carried out at a pressure from about 320 psig.

4. The process according to claim 1, wherein the reaction is carried out for about 5 hours.

5. The process according to claim 1, wherein the catalyst is removed by filtration or centrifugation.

6. The process according to claim 5, wherein the catalyst is removed by filtration.

7. The process according to claim 1, wherein said catalyst recycled to step (c) displays essentially no loss of catalytic activity or selectivity, as compared to step (a).

8. The process according to claim 1, wherein said catalyst is fixed on a support material.

9. The process according to claim 8, wherein said catalyst is incorporated within a fixed bed catalyst system.

10. The process according to claim 1, wherein said recycled catalyst is not subjected to further treatment before being recycled to step (a).

11. The process according to claim 1, further comprising:
    (d) removing said recycled catalyst from a product obtained in (c).

12. The process of according to claim 11, further comprising:
    recycling said catalyst from (d) to subsequent hydrogenation reactions, where said subsequent hydrogenation reactions are carried out as in (a); and further wherein (a) through (d) are repeated until a loss of greater than 50% catalytic selectivity or catalytic activity is obtained.

13. The process according to claim 11, wherein said catalyst is not subjected to further treatment prior to being recycled.

14. The process according to claim 1, wherein said product is further subjected to fractionation.

15. The hydrogenated oil obtained from the process according to claim 1, having a total percent monounsaturated acid content of from about 60–90%.

16. The hydrogenated oil obtained from the process according to claim 1, having a total percent monounsaturated acid content of from about 70–90%.

17. The hydrogenated oil obtained from the process according to claim 1, having a total percent monounsaturated acid content of from about 80–90%.

18. The hydrogenated oil obtained from the process according to claim 1, wherein said hydrogenated oil is a reactant in a process to make compounds selected from the group consisting of: diesters of diols, fatty acid alcohols, polyol polyesters, aldehydes, imines and amines.

19. The process according to claim 1, wherein the copper-chromium containing catalyst comprises a mixture of CuO and $Cr_2O_3$ or CuO and $CuCr_2O_4$.

20. The process according to claim 19, wherein said copper-chromium containing catalyst further comprises a metal oxide promoter.

21. The process according to claim 20, wherein said promoter is BaO.

22. The hydrogenated oil obtained from the process according to claim 1, wherein said hydrogenated oil is separated into liquid and solid fractions.

23. The hydrogenated oil obtained from the process according to claim 22, wherein said liquid fraction is further subjected to a winterization process.

24. The hydrogenated oil obtained from the process according to claim 22, wherein said liquid fraction is further subjected to fractionation to separate cis and trans isomers in said hydrogenated oil.

25. The process according to claim 1, wherein said polyunsaturated oil is obtained from an animal or a plant.

26. The process according to claim 25, wherein said polyunsaturated oil is obtained from a plant.

27. The process according to claim 26, wherein said plant is genetically engineered or modified.

28. The process according to claim 27, wherein said plant further comprises a fatty acid compositional content which is different than that of the non-genetically engineered or non-modified plant of the same species.

29. The process according to claim 26, wherein said polyunsaturated oil is selected from the group consisting of soybean oil, sunflower oil, rapeseed oil, canola oil and corn oil.

30. The process according to claim 29, wherein said polyunsaturated oil is soybean oil.

* * * * *